United States Patent
Garner et al.

(10) Patent No.: US 12,245,619 B1
(45) Date of Patent: Mar. 11, 2025

(54) CONTINUOUS MINI CORNDOG PRODUCTION PROCESS

(71) Applicant: Tyson Foods, Inc., Springdale, AR (US)

(72) Inventors: Carrie M. Garner, Springdale, AR (US); Leslie N. Mann, Springdale, AR (US); Mark G. Adkins, Wilkesboro, NC (US)

(73) Assignee: Tyson Foods, Inc., Springdale, AR (US)

( * ) Notice: Subject to any disclaimer, the term of this patent is extended or adjusted under 35 U.S.C. 154(b) by 1081 days.

(21) Appl. No.: 16/428,115

(22) Filed: May 31, 2019

Related U.S. Application Data (60) Provisional application No. 62/695,689, filed on Jul. 9, 2018.

(51) Int. Cl.
| | | |
|---|---|---|
| *A23L 13/60* | (2016.01) | |
| *A21D 10/04* | (2006.01) | |
| *A23L 5/10* | (2016.01) | |
| *A23L 7/157* | (2016.01) | |
| *A23P 20/10* | (2016.01) | |
| *A23P 30/20* | (2016.01) | |

(52) U.S. Cl.
CPC .............. *A23L 13/62* (2016.08); *A21D 10/04* (2013.01); *A23L 5/12* (2016.08); *A23L 7/157* (2016.08); *A23L 13/65* (2016.08); *A23P 20/10* (2016.08); *A23P 30/20* (2016.08); *A23V 2300/10* (2013.01); *A23V 2300/16* (2013.01); *A23V 2300/20* (2013.01); *A23V 2300/38* (2013.01)

(58) Field of Classification Search
CPC . A23L 13/62; A23L 13/65; A23L 5/12; A23L 7/157; A23P 20/10; A23P 30/20; A21D 10/04
See application file for complete search history.

(56) References Cited

U.S. PATENT DOCUMENTS

| | | | | |
|---|---|---|---|---|
| 2,723,645 | A * | 11/1955 | Garapolo | A23B 4/08 118/30 |
| 3,669,674 | A * | 6/1972 | Klug et al. | A23L 7/157 426/652 |
| 4,675,197 | A * | 6/1987 | Banner | A23P 20/12 426/243 |
| 6,280,786 | B1 * | 8/2001 | Williams | A23L 13/62 426/305 |
| 8,277,858 | B2 | 10/2012 | Bows et al. | |
| 9,648,900 | B2 | 5/2017 | Pickford | |
| 2012/0196005 | A1 * | 8/2012 | Pickford | A23L 13/57 426/291 |
| 2015/0150284 | A1 * | 6/2015 | Ashourian | A23L 19/00 426/305 |

OTHER PUBLICATIONS

"Cured VS Fresh Sausage" Aug. 1, 2015 https://blog.lemproducts.com/cured-vs-fresh-sausage/ (Year: 2015).*

(Continued)

*Primary Examiner* — Katherine D Leblanc
(74) *Attorney, Agent, or Firm* — McAfee & Taft (57) ABSTRACT

A process for continuously producing a plurality of fully cooked, cured and battered frank products such as mini corndogs on a single production line is provided. The process comprises fully cooking the frank products after they have been battered.

3 Claims, 3 Drawing Sheets

(56) References Cited

OTHER PUBLICATIONS

"Beer Battered Brats!" Mar. 17, 2015 https://www.ohbiteit.com/2015/03/beer-battered-brats.html (Year: 2015).*
"Bratwurst VS Sausage" Feb. 20, 2021. https://insanelygoodrecipes.com/bratwurst-vs-sausage/ (Year: 2021).*
"Low-Pressure portioning retains product integrity" Jun. 11, 2014 https://www.foodmanufacture.co.uk/Article/2014/06/04/Food-equipment-firm-launches-3D-drum# (Year: 2014).*
"Corn Dogs" Sep. 21, 2010. https://www.cooksinfo.com/corn-dogs (Year: 2010).*

* cited by examiner

FIG. 2

CONTINUOUS MINI CORNDOG PRODUCTION PROCESS

CROSS-REFERENCE TO RELATED APPLICATION

This application claims the benefit of prior-filed U.S. provisional application No. 62/695,689 (filed on Jul. 9, 2018), which is incorporated by reference herein.

BACKGROUND

Battered frank products are traditionally made by first fully cooking, curing and forming the franks. For example, the franks can be extruded, cooked and cured in a water bath. The cured and fully cooked franks are then battered, fried, frozen and packaged. Mini corndogs, which are a popular snack and appetizer product among retail consumers, are produced on a commercial basis in this manner.

Unfortunately, the traditional process for producing battered frank products such as mini corndogs involves multiple production steps and is not carried out on a single, continuous-flow production line. Although commercial food processing equipment has been developed for cooking other types of fried products on a single, continuous-flow production line, it is thought that the needed texture and shape of battered frank products cannot be replicated using such equipment. There is a need for a more streamlined and efficient process for producing battered frank products such as mini corndogs on a commercial basis.

SUMMARY

A process for continuously producing a plurality of fully cooked, cured and battered frank products on a single production line, comprising:
 (a) providing raw frank meat, a curing agent, and water;
 (b) mixing the raw frank meat, curing agent and water together to form a raw frank meat mixture;
 (c) portioning and shaping the raw frank meat mixture into a plurality of raw, portioned and shaped frank meat pieces;
 (d) battering the raw, portioned and shaped frank meat pieces;
 (e) par frying the raw, battered, portioned and shaped frank meat pieces to set the batter on the pieces; and
 (f) fully cooking the par fried, battered, portioned and shaped frank meat pieces, wherein the steps (a) through (f) are carried out on a continuous basis.

BRIEF DESCRIPTION OF THE DRAWINGS

The drawings included with this application illustrate certain aspects of specific embodiments of the process disclosed herein. However, the embodiments disclosed herein, as shown by the drawings, should not be viewed as the exclusive embodiments. The subject matter disclosed herein is capable of considerable modifications, alterations, combinations, and equivalents in form and function, as will occur to those skilled in the art with the benefit of this disclosure. For example, the specific views in the drawings are not representative of the exact size of the items shown.

DETAILED DESCRIPTION

The present disclosure may be understood more readily by reference to this detailed description as well as to the specific embodiments described herein. For simplicity and clarity of illustration, where appropriate, reference numerals may be repeated among portions of the drawings to indicate corresponding or analogous elements. In addition, numerous specific details are set forth in order to provide a thorough understanding of the disclosed subject matter and various embodiments described herein. However, it will be understood by those of ordinary skill in the art that the subject matter and embodiments described herein can be practiced without these specific details. In other instances, for example, components have not been described in detail so as not to obscure the related relevant feature being described. Also, the description is not to be considered as limiting the scope of the subject matter described herein. The drawings are not necessarily to scale and the proportions of certain parts may have been exaggerated to better illustrate details and features of the present disclosure.

Definitions

As used herein and in the appended claims, the following terms and phrases have the corresponding definitions set forth below.

A "fully cooked, cured and battered frank product" means a comminuted, semisolid sausage prepared from one or more types of raw meat that has been seasoned, battered, cured and fully cooked.

"Continuously producing" the frank products on a "single production line" means continuously producing the frank products by continuously carrying out the steps of the process on a single flow production line without interruption for a period of time, as opposed to a batch production process.

"Raw frank meat" means uncooked meat of a type that can be used to produce a plurality of fully cooked, cured and battered frank products.

A "portioned and shaped frank meat piece" means a portion of frank meat having a desired weight and desired shape.

"Applying a frying batter mixture to the outside surfaces of the frank meat pieces" means applying a frying batter mixture to all of the outside surfaces of the frank meat pieces or a portion thereof.

"Applying a pre-dust mixture to the outside surfaces of the frank meat pieces" means applying a pre-dust mixture to all of the outside surfaces of the frank meat pieces or a portion thereof.

"Par frying" the raw, battered, portioned and shaped frank meat pieces means partially frying the raw, battered, portioned and shaped frank meat pieces to set the batter into a semi-solid or solid form without fully cooking the frank meat.

"Fully cooking" the par fried, battered, portioned and shaped frank meat pieces means cooking the frank meat pieces to make them ready to eat without further cooking.

A component that "comprises" or "includes" one or more specified compounds means that the component includes the specified compound(s) alone, or includes the specified compound(s) together with one or more additional compounds.

A component that "consists of" one or more specified compounds means that the component includes only the specified compound(s).

A component that "consists essentially of" one or more specified compounds means that the component consists of the specified compound(s) alone, or consists of the specified compound(s) together with one or more additional compounds that do not materially affect the basic properties of the component.

Whenever a range is disclosed herein, the range includes independently and separately every member of the range extending between any two numbers enumerated within the range. Furthermore, the lowest and highest numbers of any range shall be understood to be included within the range set forth.

The Subject Process

In accordance with this disclosure, a process for continuously producing a plurality of fully cooked, cured and battered frank products on a single production line is provided. The process comprises:
  (a) providing raw frank meat, a curing agent, and water;
  (b) mixing the raw frank meat, curing agent, and water together to form a raw frank meat mixture;
  (c) portioning and shaping the raw frank meat mixture into a plurality of raw, portioned and shaped frank meat pieces;
  (d) battering the raw, portioned and shaped frank meat pieces;
  (e) par frying the raw, battered, portioned and shaped frank meat pieces to set the batter on the pieces; and
  (f) fully cooking the par fried, battered, portioned and shaped frank meat pieces, wherein steps (a) through (f) are carried out on a continuous basis.

As stated above, as used herein and in the appended claims, a "fully cooked, cured and battered frank product" means a comminuted, semisolid sausage prepared from one or more types of raw meat that has been seasoned, battered, cured and fully cooked. "Continuously producing" the frank products on a "single production line" means continuously producing the frank products by continuously carrying out the steps of the process on a single flow production line without interruption for a period of time, as opposed to a batch production process.

As stated above, as used herein and in the appended claims, "raw frank meat" means uncooked meat of a type that can be used to produce a plurality of fully cooked, cured and battered frank products. Examples of raw frank meat that can be used in connection with the present process include raw beef, raw poultry, raw pork, raw veal, and mixtures thereof. For example, raw skeletal muscle meat can be used. For example, raw beef can be used. For example, raw poultry can be used. For example, raw chicken can be used. For example, raw pork can be used. For example, raw veal can be used. For example, a mixture of raw skeletal meat selected from beef, pork, veal and mixtures thereof, and raw poultry can be used.

The raw frank meat, curing agent and water can be mixed together to form the raw frank meat mixture in a mixer. For example, the mixer can be a blender.

In addition to the raw frank meat, curing agent and water, at least one additional component can be provided in accordance with step (a) of the above method and mixed together with the other components to form the raw frank meat mixture in step (b) of the above method. For example, the additional component(s) can be selected from sugar, seasonings and flavor enhancers. For example, the additional component(s) can be selected from soy, corn syrup and smoke flavoring.

For example, the curing agent is of a type and is used in an amount sufficient to cure the frank meat. For example, the curing agent can be a source (natural or otherwise) of nitrate or nitrite. Nitrate is reduced to nitrite in the presence of specific bacteria that possess nitrate reducing enzymes. Nitrite reduces to nitric oxide during the curing process. In order for the frank meat to be cured, nitric oxide must be produced during the curing process.

For example, the curing agent can be elected from sodium nitrite, sodium nitrate, potassium nitrite, potassium nitrate, and mixtures thereof. For example, the curing agent can be a source of sodium nitrite. For example, the source of sodium nitrite can be selected from purified sodium nitrite, purified sodium nitrate, and mixtures thereof. Alternatively, the source of sodium nitrite can be a mixture of a natural source of nitrate and bacterial starter culture sufficient for incubating the starter culture and fermenting the mixture to reduce the nitrate to nitrite. For example, the natural source of nitrate can be a plant component. For example, the natural source of nitrate can be celery juice powder. For example, if a plant component such as celery juice powder is used, it can be incubated using a bacterial starter culture and fermented to reduce nitrate to nitrate prior to being mixed with the raw frank meat and seasoning(s).

For example, the curing agent can be used in an amount in the range of from about 1.25 grams per pound of raw frank meat to about 1.5 grams per pound of raw frank meat. For example, the curing agent can be used in an amount in the range of from about 1.3 grams per pound of raw frank meat to about 1.5 grams per pound of raw frank meat. For example, the curing agent can be used in an amount in the range of from about 1.4 grams per pound of raw frank meat to about 1.5 grams per pound of raw frank meat.

Curing the frank meat helps cause the frank meat to have a color, flavor, and aroma that are characteristic of cured franks. For example, the frank meat can have a pink cured meat color formed from the reaction of nitric oxide and myoglobin (a meat pigment similar to hemoglobin) during processing and cooking. Curing the frank meat also helps to slow spoilage of and inhibit the growth of microorganisms in the meat.

The raw frank meat mixture can be portioned and shaped into a plurality of raw, portioned and shaped frank meat pieces using one or more pieces of food processing portioning and/or shaping equipment. As stated above, as used herein and in the appended claims, a "portioned and shaped frank meat piece" means a portion of frank meat having a desired weight and desired shape.

For example, the desired weight can be within a certain range. For example, the desired weight can be in the range of from about 7 grams to about 12 grams. For example, the desired weight can be in the range of from about 8 grams to about 11 grams. For example, the desired weight can be in the range of from about 9 grams to about 10 grams.

For example, the desired shape can be the shape of a frank. For example, the desired shape can be a cylindrical shape. For example, the desired shape can be an approximate shape, for example, the approximate shape of a frank or an approximately cylindrical shape. For example, the frank meat mixture can be portioned and shaped into a plurality of raw, portioned and shaped frank meat pieces, each of said frank meat pieces having the approximate weight and shape of a mini corndog.

For example, the raw frank meat mixture can be portioned and shaped into a plurality of raw, portioned and shaped frank meat pieces (e.g., having the weight and shape of mini corndogs) in a single step using a Revo portioner. For example, the drum of the Revo portioner can be designed to portion and shape the frank meat pieces into the same portions and shapes as traditional mini corndogs.

The raw, portioned and shaped frank meat pieces each have an outside surface. For example, the step of battering the raw, portioned and shaped frank meat pieces can include applying a frying batter mixture to the outside surfaces of the frank meat pieces. As stated above, as used herein and in the appended claims, "applying a frying batter mixture to the outside surfaces of the frank meat pieces" means applying a frying batter mixture to all of the outside surfaces of the frank meat pieces or a portion thereof. For example, the frying batter mixture can be applied to all of the outside surfaces of the frank meat pieces. For example, the frying batter mixture can include water and flour. For example, the frying batter mixture can include water, flour, leavening, dextrose, starch, and other ingredients.

The step of applying a frying batter mixture to the outside surfaces of the raw, portioned and shaped frank meat pieces can include multiple battering applications. For example, in a first batter embodiment, the step of battering the raw, portioned and shaped frank meat pieces includes: (1) applying a first frying batter mixture to the outside surfaces of the raw, portioned and shaped frank meat pieces; and (2) after applying the first frying batter mixture to the outside surfaces of the raw, portioned and shaped frank meat pieces, applying a second frying batter mixture to the outside surfaces of the raw, portioned and shaped frank meat pieces. For example, in a second batter embodiment, the step of battering the raw, portioned and shaped frank meat pieces includes: (1) applying a first frying batter mixture to the outside surfaces of the raw, portioned and shaped frank meat pieces; (2) after applying the first frying batter mixture to the outside surfaces of the raw, portioned and shaped frank meat pieces, applying a second frying batter mixture to the outside surfaces of the raw, portioned and shaped frank meat pieces; and (3) after applying the second frying batter mixture to the outside surfaces of the raw, portioned and shaped frank meat pieces, applying a third frying batter mixture to the outside surfaces of the raw, portioned and shaped frank meat pieces.

For example, in both the first and second batter embodiments, the first, second, and third (if applicable) frying batter mixtures can include water and flour. For example, in both the first and second batter embodiments, the first, second and third (if applicable) frying batter mixtures can include water, flour, leavening, dextrose, and starch. For example, in both the first and second batter embodiments, the first, second and third (if applicable) batter mixtures can include other ingredients as well. For example, in both the first and second batter embodiments, the first, second, and third (if applicable) frying batter mixtures can include the same or different ingredients.

For example, in both the first and second batter embodiments, the first, second and third (if applicable) frying batter mixtures can be applied to the raw, portioned and shaped frank meat pieces using a standard batter applicator (for example, the standard applicator can form a cascading batter waterfall to coat the meat pieces) and/or a Tempura batter applicator. A Tempura batter applicator has a top hold mesh which causes the meat pieces to completely immerse in the batter.

For example, the first and second frying batter mixtures can be applied to the raw, portioned and shaped frank meat pieces using a standard batter applicator. For example, the third (if applicable) frying batter mixture can be applied to the raw, portioned and shaped frank meat pieces using a Tempura batter applicator.

For example, in both the first and second batter embodiments, the first frying batter mixture can have a Stein viscosity reading of at least about 15 seconds from top to first drip. For example, in both the first and second batter embodiments, the first frying batter mixture can have a Stein viscosity reading in the range of from about 15 seconds to about 30 seconds from top to first drip. For example, in both the first and second batter embodiments, the first frying batter mixture can have a Stein viscosity reading in the range of from about 20 seconds to about 25 seconds from top to first drip.

For example, in both the first and second batter embodiments, the second frying batter mixture can have a Stein viscosity reading of at least about 20 seconds from top to first drip. For example, the second frying batter mixture can have a Stein viscosity reading in the range of from about 20 seconds to about 35 seconds from top to first drip. For example, the second frying batter mixture can have a Stein viscosity reading in the range of from about 25 seconds to about 30 seconds from top to first drip.

For example, in the second batter embodiment, the third frying batter mixture can have a Stein viscosity reading of at least about 30 seconds from top to first drip. For example, in the second batter embodiment, the third frying batter mixture can have a Stein viscosity reading in the range of from about 30 seconds to about 50 seconds from top to first drip. For example, in the second batter embodiment, the third frying batter mixture can have a Stein viscosity reading in the range of from about 35 seconds to about 45 seconds from top to first drip.

The step of battering the frank meat pieces can further include applying a pre-dust mixture to the outside surfaces of the raw, portioned and shaped frank meat pieces before one or more of the actual batter mixture applications. As stated above, as used herein and in the appended claims, "applying a pre-dust mixture to the outside surfaces of the frank meat pieces" means applying a pre-dust mixture to all of the outside surfaces of the frank meat pieces or a portion thereof.

For example, in the first batter embodiment discussed above, the step of battering the frank meat pieces can further include: (1) before the first frying batter mixture is applied to the outside surfaces of the raw, portioned and shaped frank meat pieces, applying a first pre-dust mixture to the outside surfaces of the raw, portioned and shaped frank meat pieces; and (2) after the first frying batter mixture is applied to the outside surfaces of the raw, portioned and shaped frank meat pieces, and before the second frying batter mixture is applied to the outside surfaces of the raw, portioned and shaped frank meat pieces, applying a second pre-dust mixture to the outside surfaces of the raw, portioned and shaped frank meat pieces.

For example, in the second batter embodiment discussed above, the step of battering the frank meat pieces can further include: (1) after the first frying batter mixture is applied to the outside surfaces of the raw, portioned and shaped frank meat pieces, and before the second frying batter mixture is applied to the outside surfaces of the raw, portioned and shaped frank meat pieces, applying a first pre-dust mixture to the outside surfaces of the raw, portioned and shaped frank meat pieces; (2) after the second frying batter mixture is applied to the outside surfaces of the raw, portioned and shaped frank meat pieces, and before the third frying batter mixture is applied to the outside surfaces of the raw, portioned and shaped frank meat pieces, applying a second pre-dust mixture to the outside surfaces of the raw, portioned and shaped frank meat pieces.

For example, the first and second pre-dust mixtures can each include flour. For example, the first and second pre-dust mixtures can each include flour, seasoning, and salt. For example, the first and second pre-dust mixtures can each include other ingredients as well. For example, the first and second pre-dust mixtures can include the same or different ingredients.

For example, one or both of the first and second pre-dust mixtures can exclude water. The pre-dust steps promote adhesion of the batter mixtures to the frank meat pieces and work better if the pre-dust mixtures do not include water. For example, both of the first and second pre-dust mixtures can exclude water.

For example, the step of applying the first, second, and/or third battering mixtures to the raw, portioned and shaped frank meat pieces can result in a total batter pickup of at least about 15%. For example, the step of battering the raw, portioned and shaped frank meat pieces can result in a batter pickup in the range of from about 15% to about 55%. For example, the step of battering the raw, portioned and shaped frank meat pieces can result in a batter pickup in the range of from about 22% to about 38%. For example, the step of battering the raw, portioned and shaped frank meat pieces can result in a batter pickup in the range of from about 26% to about 34%.

For example, in both the first and second batter embodiments, the step of applying a first frying batter mixture to the outside surfaces of the raw, portioned and shaped frank meat pieces can result in a batter pickup of at least about 2%. For example, in both the first and second batter embodiments, the step of applying a first frying batter mixture to the outside surfaces of the raw, portioned and shaped frank meat pieces can result in a batter pickup of in the range of from about 2% to about 5%. For example, in both the first and second batter embodiments, the step of applying a first frying batter mixture to the outside surfaces of the raw, portioned and shaped frank meat pieces can result in a batter pickup of in the range of from about 2% to about 4%.

For example, in both the first and second batter embodiments, the step of applying a second frying batter mixture to the outside surfaces of the raw, portioned and shaped frank meat pieces can result in a batter pickup of at least about 8%. For example, in both the first and second batter embodiments, the step of applying a second frying batter mixture to the outside surfaces of the raw, portioned and shaped frank meat pieces can result in a batter pickup of in the range of from about 8% to about 15%. For example, in both the first and second batter embodiments, the step of applying a second frying batter mixture to the outside surfaces of the raw, portioned and shaped frank meat pieces can result in a batter pickup of in the range of from about 10% to about 14%. For example, in both the first and second batter embodiments, the step of applying a second frying batter mixture to the outside surfaces of the raw, portioned and shaped frank meat pieces can result in a batter pickup of in the range of from about 12% to about 14%.

For example, in the second batter embodiment, the step of applying a third frying batter mixture to the outside surfaces of the raw, portioned and shaped frank meat pieces can result in a batter pickup of at least about 12%. For example, in the second batter embodiment, the step of applying a third frying batter mixture to the outside surfaces of the raw, portioned and shaped frank meat pieces can result in a batter pickup of in the range of from about 12% to about 18%. For example, in the second batter embodiment, the step of applying a third frying batter mixture to the outside surfaces of the raw, portioned and shaped frank meat pieces can result in a batter pickup of in the range of from about 13% to about 16%. For example, in the second batter embodiment, the step of applying a third frying batter mixture to the outside surfaces of the raw, portioned and shaped frank meat pieces can result in a batter pickup of in the range of from about 13% to about 15%.

For example, the steps of applying the first and second pre-dust mixtures to the raw, portioned and shaped frank meat pieces can result in a pre-dust pickup of at least about 10%. For example, the steps of applying the first and second pre-dust mixtures to the raw, portioned and shaped frank meat pieces can result in a pre-dust pickup of in the range of from about 10% to about 35%. For example, the steps of applying the first and second pre-dust mixtures to the raw, portioned and shaped frank meat pieces can result in a pre-dust pickup of in the range of from about 16% to about 24%. For example, the steps of applying the first and second pre-dust mixtures to the raw, portioned and shaped frank meat pieces can result in a pre-dust pickup of in the range of from about 18% to about 22%.

For example, in both the first and second batter embodiments, the step of applying a first pre-dust mixture to the outside surfaces of the raw, portioned and shaped frank meat pieces can result in a pre-dust pickup of at least about 7%. For example, in both the first and second batter embodiments, the step of applying a first pre-dust mixture to the outside surfaces of the raw, portioned and shaped frank meat pieces can result in a pre-dust pickup of in the range of from about 7% to about 11%. For example, in both the first and second batter embodiments, the step of applying a first pre-dust mixture to the outside surfaces of the raw, portioned and shaped frank meat pieces can result in a pre-dust pickup of in the range of from about 8% to about 10%. For example, in both the first and second batter embodiments, the step of applying a first pre-dust mixture to the outside surfaces of the raw, portioned and shaped frank meat pieces can result in a pre-dust pickup of in the range of from about 9% to about 10%.

For example, in both the first and second batter embodiments, the step of applying a second pre-dust batter mixture to the outside surfaces of the raw, portioned and shaped frank meat pieces can result in a pre-dust pickup of at least about 9%. For example, in both the first and second batter embodiments, the step of applying a second pre-dust batter mixture to the outside surfaces of the raw, portioned and shaped frank meat pieces can result in a pre-dust pickup of in the range of from about 9% to about 13%. For example, in both the first and second batter embodiments, the step of applying a second pre-dust batter mixture to the outside surfaces of the raw, portioned and shaped frank meat pieces can result in a pre-dust pickup of in the range of from about 10% to about 12%. For example, in both the first and second batter embodiments, the step of applying a second pre-dust batter mixture to the outside surfaces of the raw, portioned and shaped frank meat pieces can result in a pre-dust pickup of in the range of from about 11% to about 12%.

For example, in the second batter embodiment, the step of battering the raw, portioned and shaped frank meat pieces can include the sub-steps of:
(a) applying a first frying batter mixture to the outside surfaces of the raw, portioned and shaped frank meat pieces in a manner that result in a batter pickup of in the range of from about 2% to about 5%;
(b) after the first frying batter mixture is applied to the outside surfaces of the raw, portioned and shaped frank meat pieces, applying a first pre-dust mixture to the outside surfaces of the raw, portioned and shaped frank meat pieces in a manner that result in a pre-dust pickup of in the range of from about 7% to about 11%;
(c) after applying the first pre-dust mixture to the outside surfaces of the raw, portioned and shaped frank meat pieces, applying a second frying batter mixture to the outside surfaces of the raw, portioned and shaped frank meat pieces in a manner that result in a batter pickup of in the range of from about 8% to about 15%;
(d) after applying the second frying batter mixture to the outside surfaces of the raw, portioned and shaped frank meat pieces, applying a second pre-dust mixture to the outside surfaces of the raw, portioned and shaped frank meat pieces in a manner that result in a pre-dust pickup of in the range of from about 9% to about 13%; and
(e) after applying the second pre-dust mixture to the outside surfaces of the raw, portioned and shaped frank meat pieces, applying a third frying batter mixture to the outside surfaces of the raw, portioned and shaped frank meat pieces in a manner that results in a batter pickup of in the range of from about 12% to about 18%.

For example, in the second batter embodiment, the step of battering the raw, portioned and shaped frank meat pieces can include the sub-steps of:
(a) applying a first frying batter mixture to the outside surfaces of the raw, portioned and shaped frank meat pieces in a manner that result in a batter pickup of in the range of from about 2% to about 4%;
(b) after the first frying batter mixture is applied to the outside surfaces of the raw, portioned and shaped frank meat pieces, applying a first pre-dust mixture to the outside surfaces of the raw, portioned and shaped frank meat pieces in a manner that result in a pre-dust pickup of in the range of from about 8% to about 10%;
(c) after applying the first pre-dust mixture to the outside surfaces of the raw, portioned and shaped frank meat pieces, applying a second frying batter mixture to the outside surfaces of the raw, portioned and shaped frank meat pieces in a manner that result in a batter pickup of in the range of from about 10% to about 14%;
(d) after applying the second frying batter mixture to the outside surfaces of the raw, portioned and shaped frank meat pieces, applying a second pre-dust mixture to the outside surfaces of the raw, portioned and shaped frank meat pieces in a manner that result in a pre-dust pickup of in the range of from about 10% to about 12%; and
(e) after applying the second pre-dust mixture to the outside surfaces of the raw, portioned and shaped frank meat pieces, applying a third frying batter mixture to the outside surfaces of the raw, portioned and shaped frank meat pieces in a manner that results in a batter pickup of in the range of from about 13% to about 16%.

As stated above, as used herein and in the appended claims, "par frying" the raw, battered, portioned and shaped frank meat pieces means partially frying the raw, battered, portioned and shaped frank meat pieces to set the batter into a semi-solid or solid form without fully cooking the frank meat. For example, the par frying step can be carried out at a temperature in the range of from about 350° F. to about 390° F. for a time period in the range of from about 20 seconds to about 45 seconds. For example, the par frying step can be carried out at a temperature in the range of from about 360° F. to about 380° F. for a time period in the range of from about 25 seconds to about 40 seconds. For example, the par frying step can be carried out at a temperature in the range of from about 360° F. to about 370° F. for a time period in the range of from about 30 seconds to about 40 seconds. For example, the par frying step can be carried out in vegetable oil.

As stated above, as used herein and in the appended claims, "fully cooking" the par fried, battered, portioned and shaped frank meat pieces means cooking the frank meat pieces to make them ready to eat without further cooking. For example, the frank meat pieces can be subjected to a full lethality heat process step (e.g., cooking) to achieve food safety. For example, the par fried, battered, portioned and shaped frank meat pieces can be fully cooked in an oven. For example, the oven can be a spiral oven. For example, the oven can be a linear oven. For example, the par fried, battered, portioned and shaped frank meat pieces can be fully cooked by running the frank meat pieces through a spiral or linear oven on the single production line.

For example, the process can further comprise: (f) freezing the fully cooked, battered, portioned and shaped frank meat pieces. For example, the fully cooked, battered, portioned and shaped frank meat pieces can be frozen by a flash freezer. For example, the flash freezer can be a spiral flash freezer or a linear flash freezer. For example, the fully cooked, battered, portioned and shaped frank meat pieces can be frozen by a spiral or linear flash freezer on the single production line.

For example, the process can further comprise: (g) ice glazing the fully cooked, battered, portioned and shaped frank meat pieces. For example, the fully cooked, battered, portioned and shaped frank meat pieces can be ice glazed by applying a water mist thereto on the single production line. The ice glaze helps to protect the appearance of the breading (the batter) during storage and improves the texture of the breading.

For example, the process can further comprise: (h) packaging the fully cooked, battered, portioned and shaped frank meat pieces. For example, the frozen, fully cooked, battered, portioned and shaped frank meat pieces can be placed into bags, and the bags can be placed in cases or boxes on the single production line.

The overall process, including steps (a) through (e) and steps (f), (g) and/or (h) (if included) as described above, is carried out on a continuous basis on a single production line. The steps of providing raw frank meat, a curing agent, water and optionally other components (step (a)) and mixing the raw frank meat, curing agent, water and optionally other components together to form a raw frank meat mixture (step (b)) are essentially batch steps within the continuous process in the sense that the raw frank meat, curing agent, water and optionally other components are provided, added to the mixer and mixed together to form the raw frank meat mixture, and the raw frank meat mixture is released to the next step, one batch at a time. However, steps (a) and (b) can create enough output to allow the process to be continuous. Furthermore, steps (a) and (b) can be repeatedly carried out as necessary to allow the process to continue as desired. Accordingly, as used herein, steps (a) and (b) are considered to be carried out on a continuous basis in connection with the overall continuous process.

Figure 1:
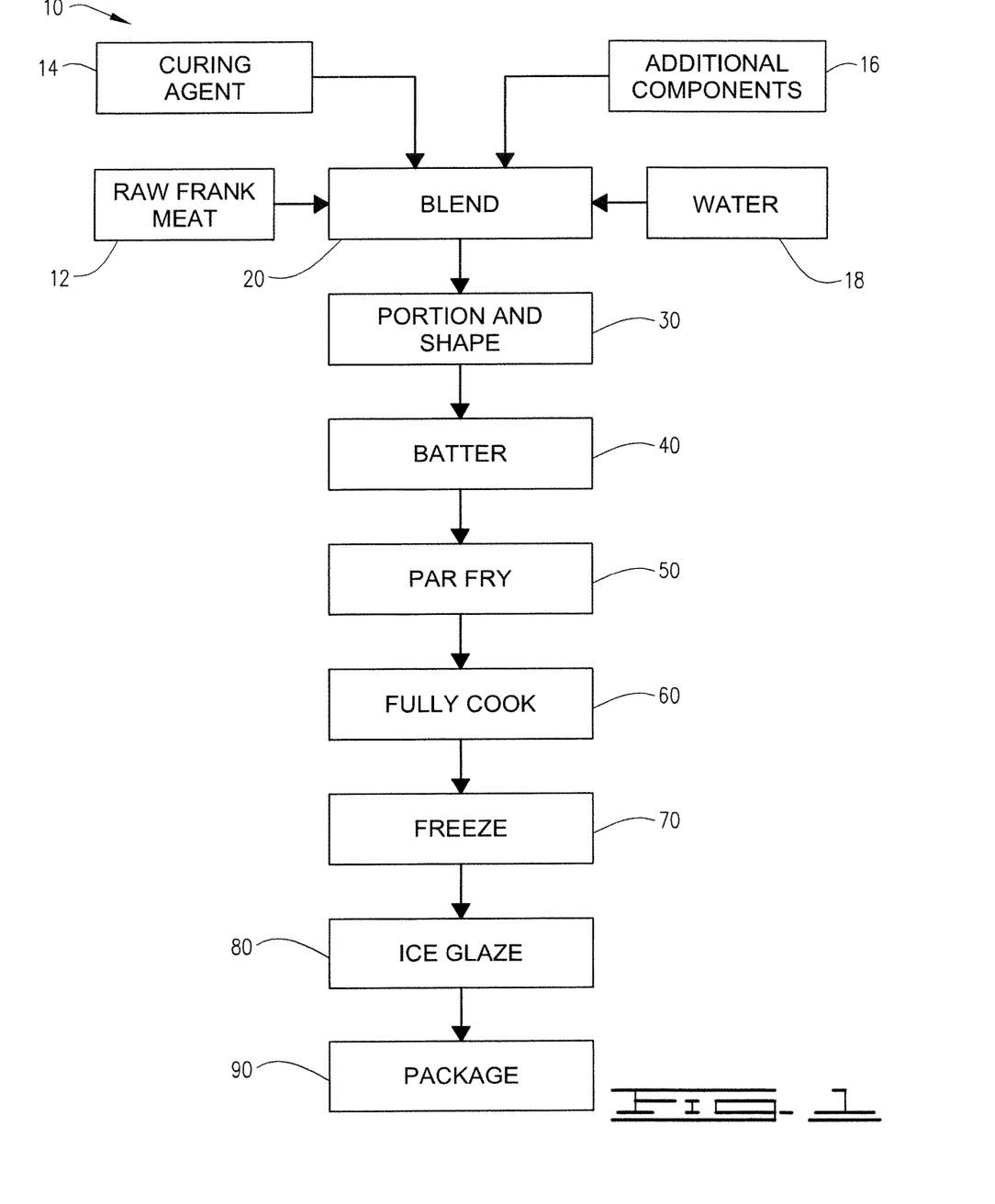
FIG. 1 is a flow diagram of a single production line on which one embodiment of the process disclosed herein can be carried out.
Figure 2:
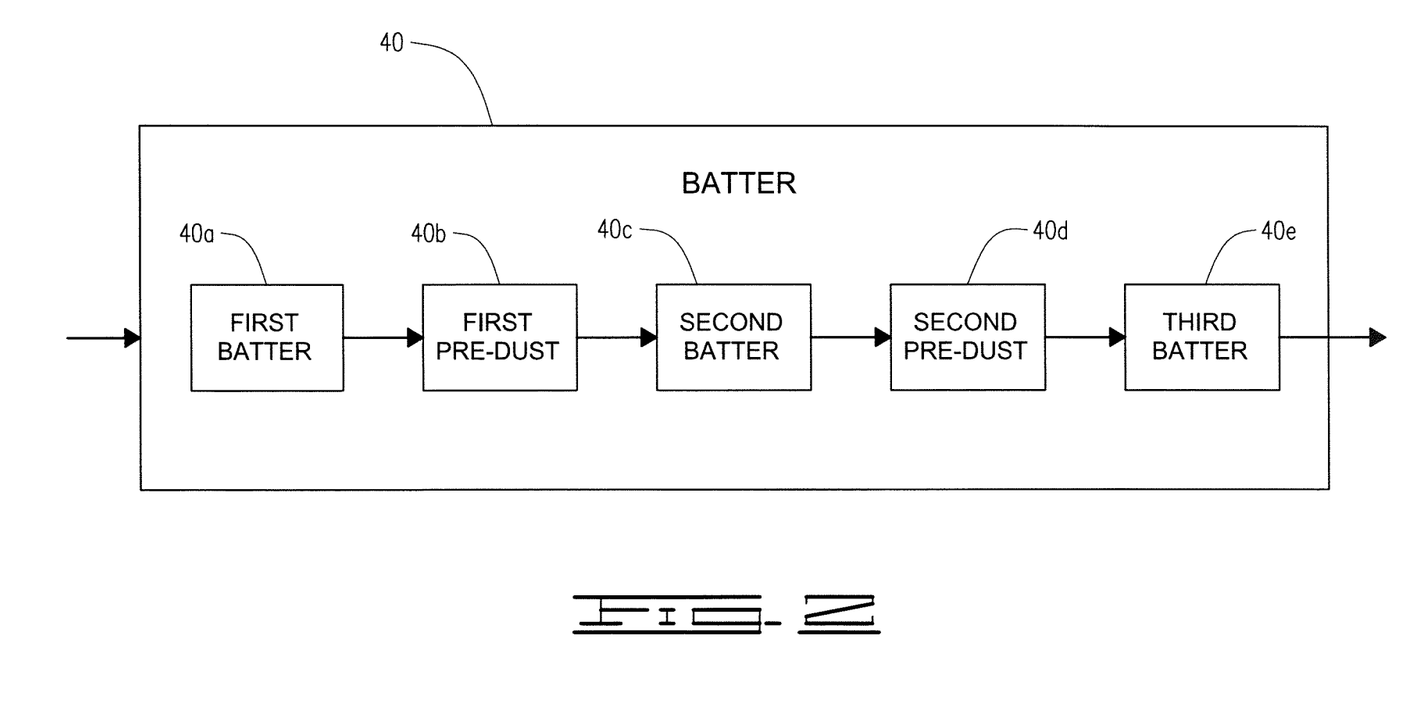
FIG. 2 is a more detailed flow diagram of the battering step shown by FIG. 1.

Referring now to FIGS. 1 and 2, a flow diagram of a single production line on which one embodiment of the process disclosed herein can be carried out, generally designated by the reference numeral 10, is illustrated. Raw frank meat, a curing agent, additional components (for example, sugar, seasonings and/or flavor enhancers) and water are fed from a source of raw frank meat 12, a source of curing agent 14, a source of additional components 16, and a source of water 18 into a blender 20. In the blender 20, the raw frank meat, curing agent, additional components and water are blended together to form a raw frank meat mixture.

The raw frank meat mixture is then fed from the blender 20 into a Revo portioner 30 and portioned and shaped thereby into a plurality of raw, portioned and shaped frank meat pieces.

The raw, portioned and shaped frank meat pieces are then conveyed from the Revo portioner 30 into a batter applicator 40 wherein a frying batter mixture is applied to the outside surfaces of the frank meat pieces. As shown by FIG. 2, which is a more detailed view of the batter applicator 40, the raw, portioned and shaped frank meat pieces are first conveyed from the Revo portioner 30 to a first frying batter mixture applicator 40*a*, wherein a first frying batter mixture is applied to the outside surfaces of the frank meat pieces. Next, the raw, portioned and shaped frank meat pieces are conveyed from the first frying batter mixture applicator 40*a* to a first pre-dust applicator 40*b*, wherein a first pre-dust mixture is applied to the outside surfaces of the frank meat pieces. Next, the raw, portioned and shaped frank meat pieces are conveyed from the first pre-dust applicator 40*b* to a second frying batter mixture applicator 40*c*, wherein a second frying batter mixture is applied to the outside surfaces of the frank meat pieces. Next, the raw, portioned and shaped frank meat pieces are conveyed from the second frying batter mixture applicator 40*c* to a second pre-dust applicator 40*d*, wherein a second pre-dust mixture is applied to the outside surfaces of the frank meat pieces. Finally, the raw, portioned and shaped frank meat pieces are conveyed from the second pre-dust applicator 40*d* to a third frying batter mixture applicator 40*e*, wherein a third frying batter mixture is applied to the outside surfaces of the frank meat pieces. The first and second batter mixture applicators 40*a* and 40*c* are standard batter applicators, whereas the third batter mixture applicator 40*e* is a Tempura batter applicator.

The raw, battered, portioned and shaped frank meat pieces are then conducted from the third batter mixture applicator 40*e* to a par fryer 50, wherein they are par fried to set the batter thereon. From the par fryer 50, the par fried, battered, portioned and shaped frank meat pieces are conveyed to a spiral oven 60, where they are fully cooked. From the spiral oven 60, the fully cooked, battered, portioned and shaped frank meat pieces are conveyed to a spiral flash freezer 70, where they are frozen. From the spiral flash freezer 70, the frozen, fully cooked, battered, portioned and shaped frank meat pieces are conveyed to a water mist applicator 80, where they are ice glazed. From the water mist applicator 80, the battered, portioned and shaped frank meat pieces (for example, frozen mini corndogs) are conveyed into a packaging apparatus 90, where they are packaged in frozen form. The process is continuously carried out.

Figure 3A:
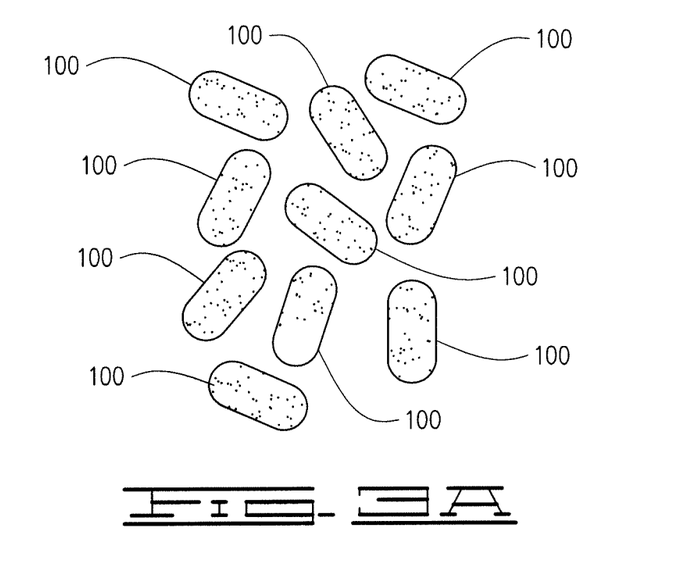
FIG. 3A illustrates a plurality of fully cooked, cured and battered mini corndogs produced on a single production line in accordance with the process disclosed herein and illustrated by FIG. 1.
Figure 3B:
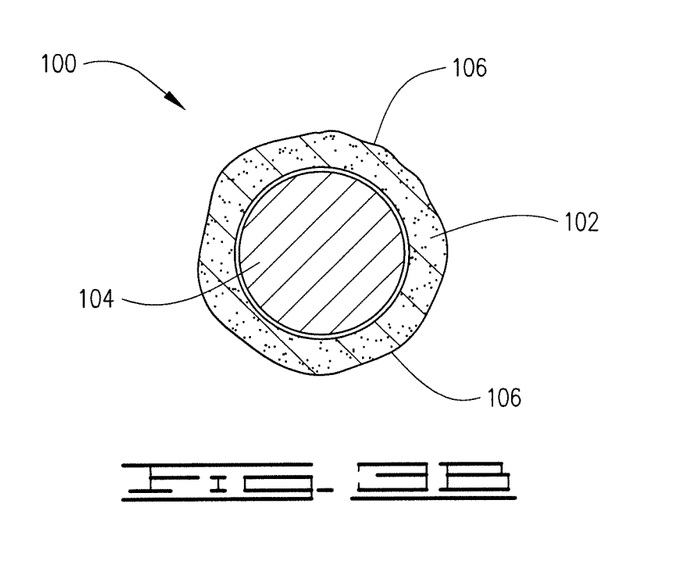
FIG. 3B is an enlarged sectional view illustrating one of the mini corndogs illustrated by FIG. 3A.

FIG. 3A illustrates a plurality of frozen, fully cooked mini corndogs 100 that have been produced by the process disclosed herein as illustrated by FIGS. 1 and 2. As shown, the mini corndogs have the size and shape of traditional mini corndogs. FIG. 3B is an enlarged, sectional view of one of the mini corndogs 100. As shown, the mini corndog 100 has an outer batter layer 102 surrounding an inner frank meat layer 104. The mini corndog 100, specifically the outer batter layer 102, has an outside surface 106.

Thus, in accordance with the process disclosed herein, a plurality of fully cooked, battered frank products can be continuously provided on a continuous basis. For example, the frank products can be mini corndogs.

The continuous process disclosed herein streamlines the traditional process for making battered frank products in that it can easily and efficiently be carried out on a single production line. Unlike the current mini corndog production processes, the franks in the process disclosed herein are not fully cooked before being battered; rather, they are fully cooked in an oven after they have been battered and the batter has been set. This allows the battered franks to be produced on a single production line and the overall process to be more efficiently carried out. For example, mini corndogs having the same shape, texture, color, bite and taste as traditional mini corndogs can be produced.

For example, although portioning and shaping food processing equipment such as Revo machines, batter applicators such as tempura batter applicators and linear and spiral ovens have been used to produce uncured food products such as chicken nuggets, it has been thought that the texture, shape and other desirable properties of traditional battered frank products such as mini corndogs cannot be replicated using such equipment. For example, fully cooking battered products in an oven can tend to make the battered products soft and gummy as opposed to crisp and crunchy.

The pre-dust and battering steps of the process disclosed herein cause the battered franks to stay crispy through the oven cooking step, freezing step, and packaging step of the process. The battered franks remain crispy and have a fry-back texture even after being reheated in an oven by the consumer.

EXAMPLES

The following example illustrates specific embodiments consistent with the present disclosure but do not limit the scope of the disclosure or the appended claims. Concentrations and percentages are by weight unless otherwise indicated.

Example 1

A single production line generally as shown by FIGS. 1 and 2 was set up, and the process disclosed herein, as described above, was carried out thereon to produce a plurality of fully cooked, cured and battered mini corndogs. The mini corndogs were frozen, ice glazed and packaged in accordance with the process. For example, the portioning and shaping step was carried out by a Revo portioner. The first and second batter mixture applicators 40*a* and 40*c* were standard batter applicators, whereas the third batter mixture applicator 40*e* was a Tempura batter applicator.

The first and second frying batter mixtures were applied to the outside surfaces of the mini corndogs using a standard batter applicator, whereas the third batter mixture was applied to the outside surfaces of the mini corndogs using a Tempura batter applicator.

It was determined that the first frying batter mixture had a Stein viscosity reading in the range of 20-25 seconds from top to first drip, that the second frying batter mixture had a Stein viscosity reading in the range of 25-30 seconds from top to first drip, and that the third frying batter mixture had a Stein viscosity reading in the range of 35-45 seconds from top to first drip.

It was further determined that the application of the first frying batter mixture to the outside surfaces of the mini corndogs resulted in a batter pickup of about 3%. The application of the first pre-dust mixture to the outside surfaces of the mini corndogs resulted in a pre-dust pickup of about 9%. The application of the second frying batter mixture to the outside surfaces of the mini corndogs resulted in a batter pickup of about 12%. The application of the second pre-dust mixture to the outside surfaces of the mini corndogs resulted in a pre-dust pickup of about 110%. Finally, the application of the third frying batter mixture to the outside surfaces of the mini corndogs resulted in a batter pickup of about 15%.

The par frying step was carried out in vegetable oil at about 365° F. for about 20 seconds. The cooking step was carried out in a linear oven. The entire process was carried out on a continuous basis.

The produced product had the approximate weight, texture and shape of a mini corndog.

Thus, the process disclosed herein, as described above, was successfully carried out to produce a plurality of fully cooked, cured and battered mini corndogs.

Therefore, the process disclosed herein is well adapted to attain the ends and advantages mentioned, as well as those that are inherent therein. The particular example disclosed above is illustrative only, as the process disclosed herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative example disclosed above may be altered or modified, and all such variations are considered within the scope and spirit of the present process. While the present process and system and the individual steps and components thereof may be described in terms of "comprising," "containing," "having," or "including" various steps or components, the process and system can also, in some examples, "consist essentially of" or "consist of" the various steps and components. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A process for continuously producing a plurality of fully cooked, cured and battered frank products on a commercial basis on a single production line, comprising:
    (a) providing raw frank meat, a curing agent, and water, wherein said curing agent is of a type and used in an amount sufficient to cure said frank meat;
    (b) mixing said raw frank meat, curing agent and water together to form a raw frank meat mixture;
    (c) portioning and shaping said raw frank meat mixture into a plurality of raw, portioned and shaped frank meat pieces using food processing portioning and shaping equipment;
    (d) battering said raw, portioned and shaped frank meat pieces using more than one battering application, wherein said each of said raw, portioned and shaped frank meat pieces has an outside surface, and said step of battering said frank meat pieces includes applying a frying batter mixture to said outside surfaces of said frank meat pieces, and wherein said step applying a frying batter mixture to said outside surfaces of said frank meat pieces of includes:
        (1) applying a first frying mixture to said outside surfaces of said raw, portioned and shaped frank meat pieces;
        (2) after applying said first frying batter mixture to said outside surfaces of said raw, portioned and shaped frank meat pieces, applying a second frying batter mixture to said outside surfaces of said raw, portioned and shaped frank meat pieces, wherein said second frying batter mixture has a higher viscosity that that of said first frying batter mixture; and
        (3) after applying said second frying batter mixture to said outside surfaces of said raw, portioned and shaped frank meat pieces, applying a third frying batter mixture to said outside surfaces of said raw, portioned and shaped frank meat pieces, wherein said third frying batter mixture has a higher viscosity that that of said second frying batter mixture;
    (e) par frying said raw, battered, portioned and shaped frank meat pieces to set said batter on said pieces; and
    (f) fully cooking said par fried, battered, portioned and shaped frank meat pieces in an oven, wherein said steps (a) through (f) are carried out on a continuous basis to form a continuous-flow production line.

2. A process for continuously producing a plurality of fully cooked, cured and battered frank products on a commercial basis on a single production line, comprising:
    (a) providing raw frank meat, a curing agent, and water, wherein said curing agent is of a type and used in an amount sufficient to cure said frank meat;
    (b) mixing said raw frank meat, curing agent and water together to form a raw frank meat mixture;
    (c) portioning and shaping said raw frank meat mixture into a plurality of raw, portioned and shaped frank meat pieces using food processing portioning and shaping equipment, each of said raw, portioned and shaped frank meat pieces having an outside surface;
    (d) battering said raw, portioned and shaped frank meat pieces, including:
        (1) applying a first frying batter mixture to the outside surfaces of said raw, portioned and shaped frank meat pieces;
        (2) after applying said first frying batter mixture to said outside surfaces of said raw, portioned and shaped frank meat pieces, applying a second frying batter mixture to said outside surfaces of said raw, portioned and shaped frank meat pieces, wherein said second frying batter mixture has a higher viscosity that that of said first frying batter mixture; and
        (3) after applying said second frying batter mixture to said outside surfaces of said raw, portioned and shaped frank meat pieces, applying a third frying batter mixture to said outside surfaces of said raw, portioned and shaped frank meat pieces, wherein said third frying batter mixture has a higher viscosity that that of said second frying batter mixture;
    (e) after battering, par frying said raw, battered, portioned and shaped frank meat pieces to set said batter on said pieces; and
    (f) fully cooking said par fried, battered, portioned and shaped frank meat pieces in an oven, wherein said steps (a) through (f) are carried out on a continuous basis to form a continuous-flow production line.

3. A process for continuously producing a plurality of fully cooked, cured and battered mini corndogs on a commercial basis on a single production line, comprising:

(a) providing raw frank meat, a curing agent, and water, wherein said raw frank meat is selected from raw beef, raw poultry, raw pork, raw veal, and mixtures thereof, and wherein said curing agent is of a type and used in an amount sufficient to cure said frank meat;
(b) mixing said raw frank meat, curing agent and water together to form a raw frank meat mixture;
(c) portioning and shaping said raw frank meat mixture into a plurality of raw, portioned and shaped frank meat pieces in a single step using a portioning and shaping food processing machine, each of said raw, portioned and shaped frank meat pieces having an outside surface and having the approximate weight and shape of a mini corndog;
(d) battering said raw, portioned and shaped frank meat pieces, including:
  (1) applying a first frying batter mixture to the outside surfaces of said raw, portioned and shaped frank meat pieces;
  (2) after said first frying batter mixture is applied to said outside surfaces of said raw, portioned and shaped frank meat pieces, applying a first pre-dust mixture to said outside surfaces of said raw, portioned and shaped frank meat pieces;
  (3) after applying said first pre-dust mixture to said outside surfaces of said raw, portioned and shaped frank meat pieces, applying a second frying batter mixture to said outside surfaces of said raw, portioned and shaped frank meat pieces, wherein said second frying batter mixture has a higher viscosity that that of said first frying batter mixture;
  (4) after said second frying batter mixture is applied to said outside surfaces of said raw, portioned and shaped frank meat pieces, applying a second pre-dust mixture to said outside surfaces of said raw, portioned and shaped frank meat pieces; and
  (5) after applying said second pre-dust mixture to said outside surfaces of said raw, portioned and shaped frank meat pieces, applying a third frying batter mixture to said outside surfaces of said raw, portioned and shaped frank meat pieces, wherein said third frying batter mixture has a higher viscosity that that of said second frying batter mixture;
(e) after battering, par frying said raw, battered, portioned and shaped frank meat pieces to set said batter on said pieces;
(f) fully cooking said par fried, battered, portioned and shaped frank meat pieces in an oven;
(g) freezing said fully cooked, battered, portioned and shaped frank meat pieces; and
(h) packaging said fully cooked, battered, portioned and shaped frank meat pieces, wherein said steps (a) through (h) are carried out on a continuous basis to form a continuous-flow production line.

* * * * *